(12) United States Patent
Hazucha

(10) Patent No.: US 6,819,573 B2
(45) Date of Patent: Nov. 16, 2004

(54) DC TO DC SWITCHING POWER CONVERTER WITH PARTIAL-SWING SWITCHING AND METHOD

(75) Inventor: Peter Hazucha, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/008,242

(22) Filed: Nov. 7, 2001

(65) Prior Publication Data

US 2004/0145919 A1 Jul. 29, 2004

(51) Int. Cl.$^7$ ........................ H02M 3/335; H02H 7/122
(52) U.S. Cl. ........................ 363/17; 363/56.02; 363/132
(58) Field of Search ........................ 363/17, 55, 56.02, 363/98, 132

(56) References Cited

U.S. PATENT DOCUMENTS

| | | | | |
|---|---|---|---|---|
| 4,855,888 A | * | 8/1989 | Henze et al. | 363/132 |
| 5,010,257 A | * | 4/1991 | Boudon et al. | 326/110 |
| 5,198,969 A | * | 3/1993 | Redl et al. | 363/132 |
| 5,365,123 A | * | 11/1994 | Nakase et al. | 326/109 |
| 5,659,460 A | | 8/1997 | Vinciarelli | 363/21 |
| 5,708,383 A | * | 1/1998 | Lee | 327/105 |
| 6,088,250 A | | 7/2000 | Siri | 363/97 |
| 6,107,860 A | | 8/2000 | Vinciarelli | 327/427 |

* cited by examiner

*Primary Examiner*—Bao Q. Vu
(74) *Attorney, Agent, or Firm*—Schwegman, Lundberg, Woessner & Kluth, P.A.

(57) ABSTRACT

A DC to DC switching power converter includes switching elements having capacitive gate control inputs, an energy storage element and driver circuitry. The driver circuitry generates a partial-swing switching signal to at least one of switching elements to achieve efficiency improvement by reducing the energy required to charge and discharge the capacitance of the gate control input. In one embodiment, the switching power converter is fabricated on a semiconductor die to generate an output voltage to one or more functional unit blocks on the die. Several power converters can be combined to form an on-die multiphase power converter.

28 Claims, 13 Drawing Sheets

DC TO DC SWITCHING POWER CONVERTER WITH PARTIAL-SWING SWITCHING AND METHOD

FIELD OF THE INVENTION

The present invention pertains to DC to DC switching power converters, and in particular to DC to DC switching power converters fabricated on semiconductor die.

BACKGROUND OF THE INVENTION

DC to DC switching power converters are commonly used to convert one available DC voltage to another DC voltage, often needed for a particular set of semiconductor dies. Such power converters may use one or more electrically controlled switches, such as N-channel or P-channel MOSFET devices. As electronic devices become faster, smaller and more portable, the need for improved electrical efficiency in DC to DC converters is becoming more important. Improved electrical efficiency of power converters may result in less power consumption, longer battery life and greater efficiency in electronic systems such as microprocessors.

Furthermore, the operating voltage of high speed microprocessors is reduced as process technology scales and device dimensions shrink. This allows semiconductor die to operate at higher frequencies and the number of transistors integrated on a single semiconductor die to increase. Therefore, more power is consumed by semiconductor die from a power supply. The current supply paths carrying current to a semiconductor die through a circuit board must carry proportionally more current as the voltage level decreases. As a result, the parasitic elements of the current path to a semiconductor die become more pronounced. For example, narrower track widths along with increased current increase series resistance and inductance increasing ripple, power loss and voltage drop. Furthermore, increasing current requires a greater number of package pins and circuit pads for a die which reduces interconnect reliability.

N-channel and P-channel MOSFET devices, for example, have a capacitive gate control input and are turned on by charging the gate capacitance to an appropriate voltage and are turned off by discharging the gate capacitance. Driver circuitry may be used to generate the switching signals to turn on and turn off the switching devices. In many switched power converter applications, the driver circuitry may "over-drive" the gate control inputs which consumes unnecessary energy charging the gate capacitance reducing the efficiency of the power converter.

Thus there is a general need for an improved on-die power converter and power conversion method. There is also a need for a more efficient power converter and power conversion method that achieves greater efficiency by reducing the amount of energy to charge and discharge the gate capacitance of switching elements that have capacitive gate control inputs. There is also a need for an on-die power converter and power conversion method that reduces the requirements of off-chip voltage regulation modules.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

DETAILED DESCRIPTION

The description set out herein illustrates the various embodiments of the invention and such description is not intended to be construed as limiting in any manner. The present invention relates to switching power converters, and in one embodiment, an improved switching power converter and power conversion method is suitable for on-die fabrication. The power converters and power conversion methods of the present invention achieve improved efficiency by reducing the amount of energy required to charge and discharge the gate capacitance of switching elements that have capacitive gate control inputs. Partial-swing switching signals are applied to at least one of the switching elements.

In one embodiment, a DC to DC switching power converter includes switching elements, an energy storage element and driver circuitry. The switching elements have capacitive gate control inputs. The driver circuitry generates a partial-swing switching signal to at least one of switching elements for improved efficiency by reducing the energy required to charge and discharge the gate capacitance. The switching power converter may be fabricated on a semiconductor die to generate an output voltage to one or more functional unit blocks on the die. In another embodiment, several power converters may comprise an on-die multiphase power converter. In another embodiment, a semiconductor die has an on-die power converter and a functional unit block which receives power from the on-die power converter. The semiconductor die allows non-critical path function unit blocks to receive lower voltage to conserver power, for example.

Figure 1:
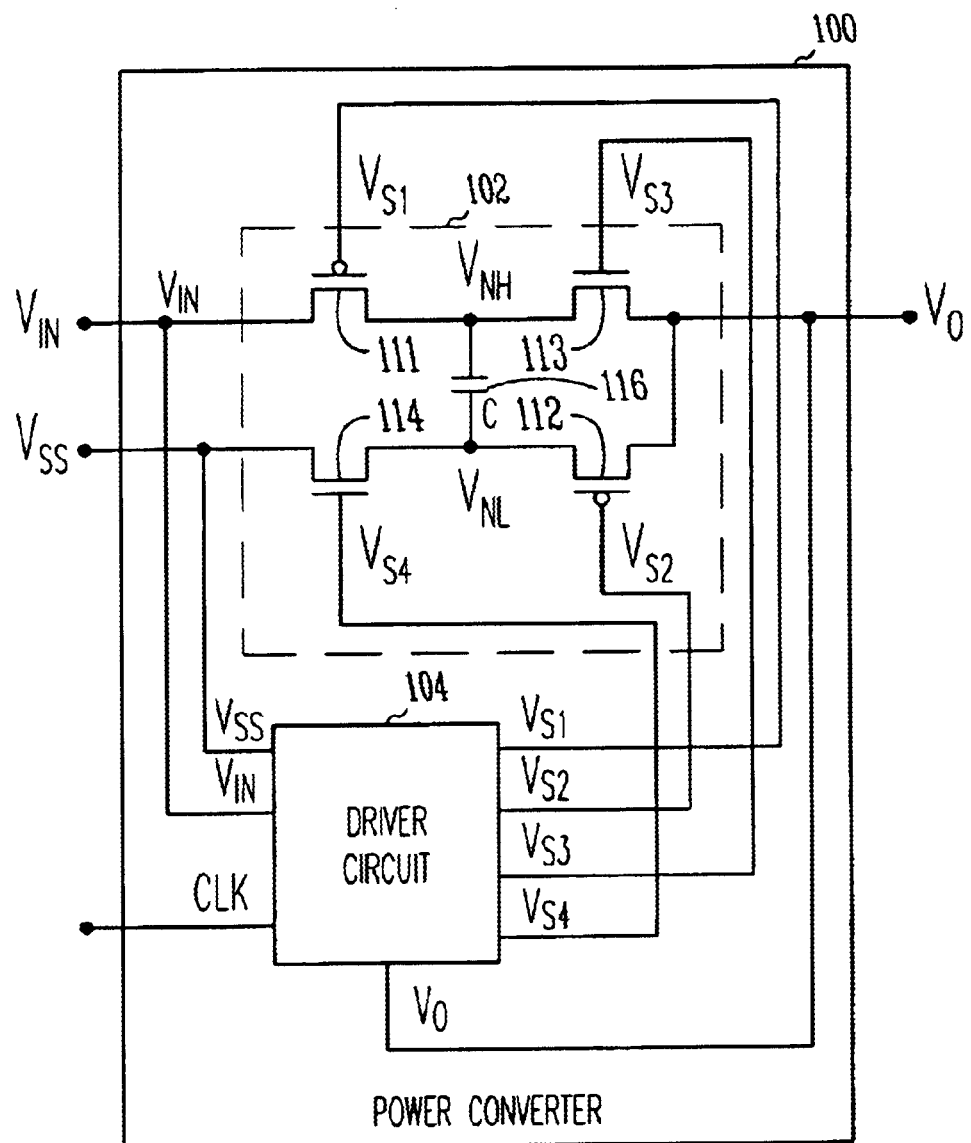
FIG. 1 is a functional block diagram of a switching power converter in accordance with an embodiment of the present invention.

FIG. 1 is a functional block diagram of a switching power converter in accordance with an embodiment of the present invention. Power converter 100 may be fabricated on a semiconductor die to power to one or more functional unit blocks on the semiconductor die. Power converter 100 generates output voltage (Vo) from input voltage (Vin) with respect to reference voltage (Vss). Vin is positive with respect to Vss which may be a negative voltage or ground potential. Vo is desirably less than Vin and may be substantially halfway between Vin and Vss.

Power converter 100 includes switching circuit 102 and driver circuit 104. Switching circuit is comprised of switching elements 111, 112, 113 and 114 and an energy storage element 116. Driver circuit 104 generates switching signals for the switching elements using an input clock signal. Switching elements 111 and 112 are on (i.e., conduct) when switching elements 113 and 114 are off (i.e., do not conduct). Switching elements 113 and 114 are on when switching elements 111 and 112 are off.

First switching element 111 couples an input voltage source to a first terminal of energy storage element 116. First switching element 111 receives a first switching signal from driver circuit 104 which turns on first switching element 111 during a first portion of a clock cycle when the first switching signal transitions from Vin to a turn-on voltage (V1on). The first switching signal turns off first switching element 111 during a second portion of the clock cycle when the first switching signal transitions from V1on to Vin.

Second switching element 112 couples a second terminal of energy storage element 116 to the output of power converter 100. Second switching element 112 receives a second switching signal from driver circuit 104 which turns on the second switching element during the first portion of the clock cycle when the second switching signal transitions from a turn-off voltage (V2off) to a turn-on voltage (V2on). The second switching signal turns off second switching element 112 during the second portion of the clock cycle when the second switching signal transitions from V2on to V2off.

Third switching element 113 couples the first terminal of energy storage element 116 to the output of power converter 100. Third switching element 113 receives a third switching signal from driver circuit 104 which turns off third switching element 113 during the first portion of the clock cycle when the third switching signal transitions from Vin to a turn-off voltage (V3off). The third switching signal turns on third switching element 113 during the second portion of the clock cycle when the third switching signal transitions from V3off to Vin.

Fourth switching element 114 couples the second terminal of energy storage element 116 with the reference voltage (Vss) of power converter 100. Fourth switching element 114 receives a fourth switching signal from driver circuit 104 which turns off fourth switching element 114 during the first portion of the clock cycle when the fourth switching signal transitions from a turn-on voltage (V4on) to Vss. The fourth switching signal turns on fourth switching element 114 during the second portion of the clock cycle when the fourth switching signal transitions from Vss to V4on.

V1on may range from Vss to substantially Vo, V2on and V2off may range from Vin to Vss, V3off may be substantially equal to Vo, and V4on may range from substantially Vo to Vin. Vin may, for example, range from 0.6v to 5v or more above ground potential Vss, and Vo may be substantially equal to half of Vin or less. Other ranges form Vo, Vin and Vss are also suitable depending on the intended use of the power converter. For example, the ranges of Vo and Vin may be significantly greater and Vo may be greater than Vin.

In accordance with the embodiment illustrated in FIG. 1, first switching element 111 may be a P-channel MOSFET switch and third and fourth switching elements 113, 114 may be an N-channel MOSFET switches. Second switching element 112 may be either a P-channel MOSFET switch (as illustrated) or an N-channel MOSFET switch (illustrated in FIG. 8). Other types of switching devices including FETs such as MESFETS, or power switching devices having a capacitive gate control input including insulated gate bipolar transistors (IGBT), and MOS controlled thyristors (MCT) may also be suitable.

Typically, full-swing switching signals (Vin to Vss) switch on and off the switching elements of switching circuits such as circuit 104. In accordance with the embodiments of the present invention, improved efficiency is achieved through the use of a partial-swing switching signal for one or more of the switching elements.

In a first embodiment when second switching element 112 is a P-channel MOSFET device, rather than receiving a full-swing voltage (Vss to Vin) to turn off second switching element 112, second switching element 112 receives less than a full-swing voltage to turn it off. In this embodiment V2off may be substantially Vo, and V2on may be substantially Vss. Furthermore, in this embodiment, rather than receiving a full-swing voltage (Vin to Vss) to turn off third switching element 113, third switching element 113 receives less than a full-swing voltage to turn it off. In this embodiment V3off may be substantially Vo. By applying a partial-swing voltage to turn off switching elements 112 and 113, less power is required to charge and discharge the gate capacitance of switching elements 112 and 113 which results in improved efficiency for power converter 100. In this embodiment, full-swing voltages are applied to first and fourth switching elements 111 and 114. In this case, V1on may be substantially Vss and V4on may be substantially Vin. It should be noted that in this embodiment, partial-swing voltages are applied to switching elements 112 and 113, while full-swing voltages are applied to switching elements 111 and 114.

In a second embodiment, in addition to switching elements 112 and 113 receiving a partial-swing voltage to turn off, first and fourth switching elements 111 and 114 receive a partial-swing voltage to turn on. In this embodiment, second switching element 112 may be a P-channel MOSFET and V1on, V2off, V3off and V4on on may be substantially Vo. By applying a partial-swing voltage to turn off switching elements 111, 112, 113 and 114, less power is required to charge and discharge the gate capacitance of these switching elements which results in improved efficiency for power converter 100.

When the switching elements receive a lower turn-on or lower turn-off voltages from the partial-swing switching signals, other device parasitics such as a parasitic series resistance, may increase. For devices that are conducting, this increase in the parasitic series resistance may offset some of these efficiency improvements gained through the reduction in energy required to charge the gate capacitance. This is explained in greater detail below.

When second switching element 112 is the N-channel MOSFET, a full-swing voltage is applied to turn on and turn off second switching element 112. In this embodiment, V2off may be substantially Vss and V2on may be substantially Vin. In this embodiment, however, a partial-swing voltage may be applied to turn off switching element 113 as described above. Partial-swing voltages may also be applied to turn on switching elements 111 and 114 as described above.

Energy storage element 116 may be any capacitive element that stores energy including a capacitor. In one embodiment, the gate capacitance of MOSFETs may be used for energy storage element 116. In accordance with another embodiments of the present invention, inductive devices are used for energy storage. In accordance with these embodiments, switching elements and energy storage elements may be configured in many ways., and the number of switching elements other than four may be used. One such embodiment, known as a Buck converter, utilizes two switches and an inductor. A terminal of the inductor is coupled to the output and another terminal of the inductor is coupled to two switching elements. One switching element connects the inductor terminal to Vin during the first phase of a clock cycle, and a second switching element connects the same terminal of the inductor to Vss during the second phase of the clock cycle. In this embodiment, the switching elements conduct alternatively and do not conduct simultaneously. In this embodiment, partial-swing switching signals may apply switching voltages between Vss and Vin. Power converter 100 may also include input and output filters (not illustrated).

Power converter 100 allows an external voltage regulation module to generate higher input voltage levels with lower input current to a semiconductor die. Power converter 100 converts the higher input voltage levels with lower input current to a lower voltage for use by the semiconductor die, although this is not a requirement. For example, a group of functional unit blocks on a die may operate at or greater than Vin while another group of functional unit blocks may operate at, for example, 70% of Vin.

Figure 2:
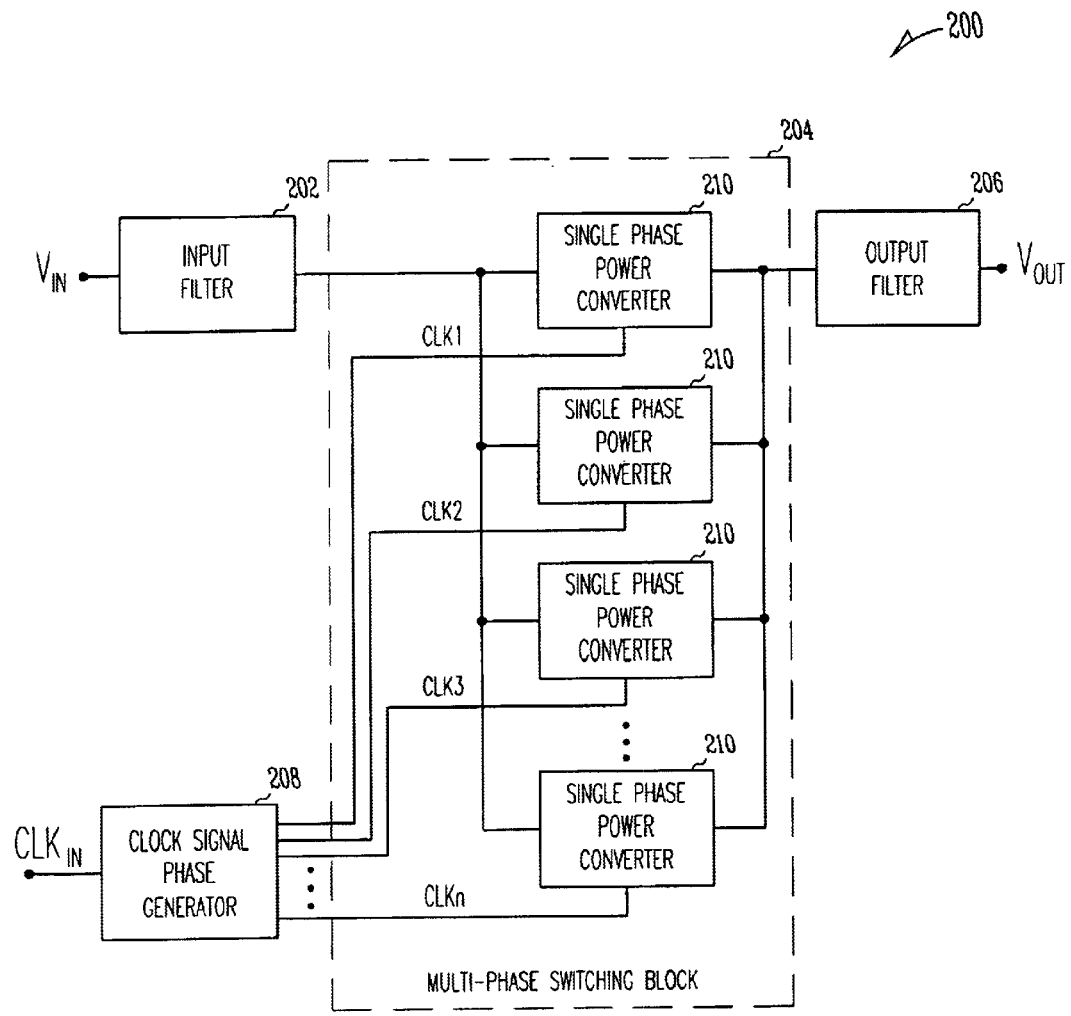
FIG. 2 is a functional block diagram of a multiphase power converter in accordance with an embodiment of the present invention.

FIG. 2 is a functional block diagram of a multiphase power converter in accordance with an embodiment of the present invention. Multiphase power converter 200 may include input filter 202 to receive input current from an input voltage source, and multiphase switching block 204 to receive input current and phase-shifted clock signals and to generate an output voltage. Multiphase power converter 200 may also include output filter 206 to receive the output voltage from multi phase switching block 204 and generate a filtered voltage output. Multiphase power converter 200 also includes clock signal phase generator 208 to generate the phase-shifted clock signals. In accordance with one embodiment, multiphase switching block 204 is comprised of a plurality of single phase power converters 210. Each of single phase power converters 210 receives one of the phase-shifted clock signals from clock signal phase generator 208. Input filter 202 and output filter 206 are optional elements and need not be included depending on the particular application for which multiphase power converter 200 is intended. Power converter 100 (FIG. 1) may be suitable for use a one of single phase power converters 210.

Each single phase power converter 210 receives a clock signal and draws input current during a first portion of the clock cycle. Each single phase power converter 210 also generates current during a second portion of the clock cycle. Because each clock signal generated for the various single phase power converters is shifted in phase, the current drawn by each successive single phase power converters is also shifted in phase, allowing the combination of single phase power converters 210 to draw a more level input current over an entire clock cycle and to generate a more level output voltage over the clock cycle. When power converter 200 includes N single phase power converters 210 and the clock signal has a period (T), each phase-shifted clock signal may be shifted in phase by an amount substantially equal to T/N. The number N of single phase power converters 210 may range from two up to a hundred or more, although less than ten single phase power converters 210 may be suitable for many applications.

Figure 3:
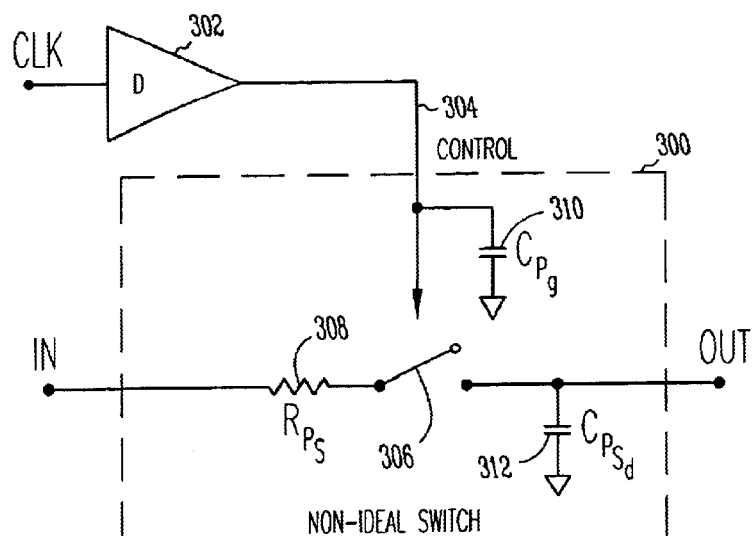
FIG. 3 illustrates a simplified non-ideal switching element.

FIG. 3 illustrates a simplified non-ideal switching element. Non-ideal switching element 300 is a simplified model of a FET switch such as a MOSFET switch and may be used to understand some of the non-ideal characteristics of switching elements 111, 112, 113 and 114 of switching circuit 102 (FIG. 1). Those of skill in the art understand that additional non-ideal elements may be used to illustrate a non-ideal FET switch. Driver 302 applies control signal 304 to a gate of switching element 300 causing ideal switch 306 to open or close. Switching element 300 includes parasitic series resistance (Rps) 308, parasitic gate capacitance (Cpg) 310 and parasitic source-drain capacitance (Cpsd) 312.

The greater the voltage swing applied by control signal 304, the more energy that is consumed charging and discharging Cpg 310. Accordingly, for improved efficiency of a power converter, a reduction in the voltage swing is desirable. In case of an NMOS transistor, voltage swing may be reduced either by reducing the turn-on voltage or increasing the turn-off voltage. In case of a PMOS transistor, voltage swing may be reduced either by increasing the turn-on voltage or reducing the turn-off voltage. When the voltage swing is reduced by changing the turn-off voltage, Rps in the off state will decrease, but this has little or no effect on power converter efficiency as long as the channel is not biased in inversion. Modifying the turn-on voltage to reduce the swing, however increases Rps 308. Therefore, reducing swing by modifying the turn-on voltage results in a tradeoff between the reduction in energy wasted in charging and discharging Cpg and the increase in resistive loss resulting from an increase of Rps. Depending on the current requirements of a power converter, a designer of ordinary skill in the art can choose whether to apply "partial" voltage swing to switching elements by modifying turn-off or both turn-off and turn-on voltage to achieve the greatest efficiency improvement.

Figure 4:
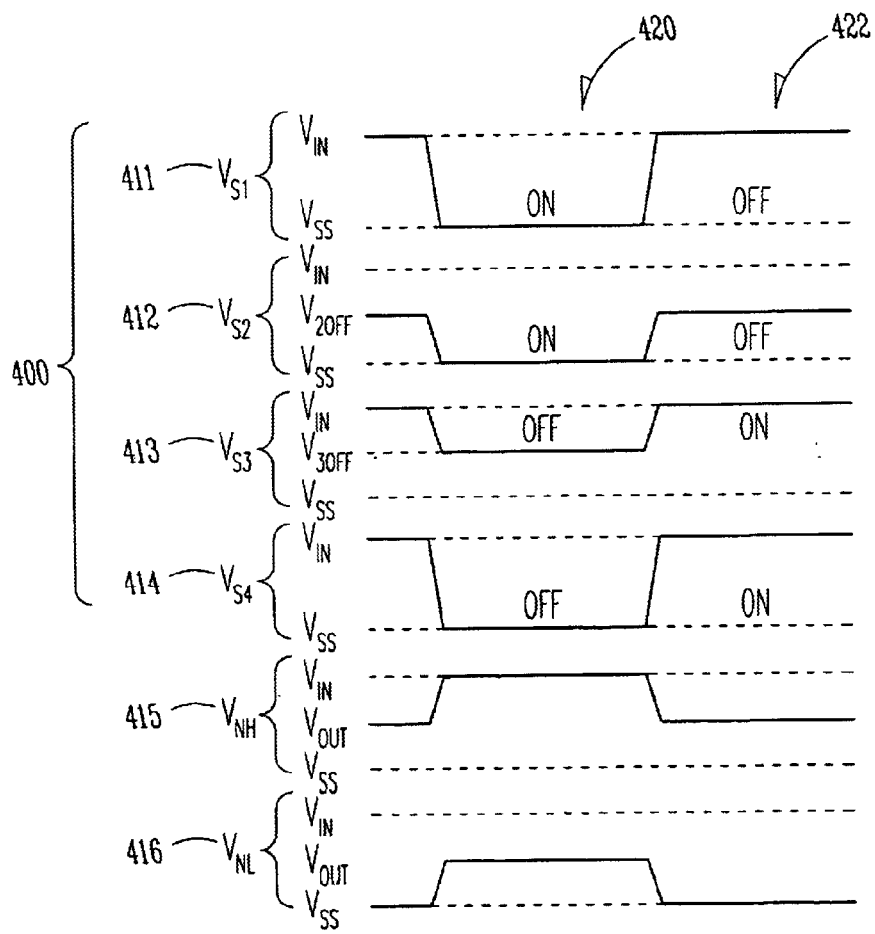
FIG. 4 illustrates voltage levels for a first embodiment of the switching power converter illustrated in FIG. 1 in accordance with an embodiment of the present invention.

FIG. 4 illustrates voltage levels for a first embodiment of the switching power converter illustrated in FIG. 1. Switching signals 400 are examples of the switching signals that driver circuit 104 may generate for switching circuit 102. In this embodiment, switching elements 112 and 113 receive partial-swing switching signals.

First switching signal (Vs1) 411 turns on first switching element 111 (FIG. 1) during first portion 420 of a clock cycle and turns off first switching element 111 during second portion 422 of the clock cycle. In this embodiment, a full-swing voltage (e.g., Vin to Vss) turns on first switching element 111. Second switching signal (Vs2) 412 turns on second switching element 112 (FIG. 1) during first portion 420 of the clock cycle and turns off second switching element 112 during second portion 422 of the clock cycle. In this embodiment, second switching element 112 may be a P-channel MOSFET device and a partial-swing voltage (e.g., Vss to V2off) turns off second switching element 112. Third switching signal (Vs3) 413 turns off third switching element 113 (FIG. 1) during first portion 420 of the clock cycle and turns on third switching element 113 during second portion 422 of the clock cycle. In this embodiment, a partial-swing voltage (e.g., Vin to V3off) turns off third switching element 112. Fourth switching signal (Vs4) 414 turns off fourth switching element 114 (FIG. 1) during first portion 420 of the clock cycle and turns on fourth switching element 114 during second portion 422 of the clock cycle. In this embodiment, a full-swing voltage (e.g., Vin to Vss) turns off fourth switching element 114. Voltages 415 (VNH) and 416 (VNL) illustrate the voltages respectively at nodes VNH and VNL of power converter 100 (FIG. 1) in response to switching signals 411 through 414.

Figure 5:
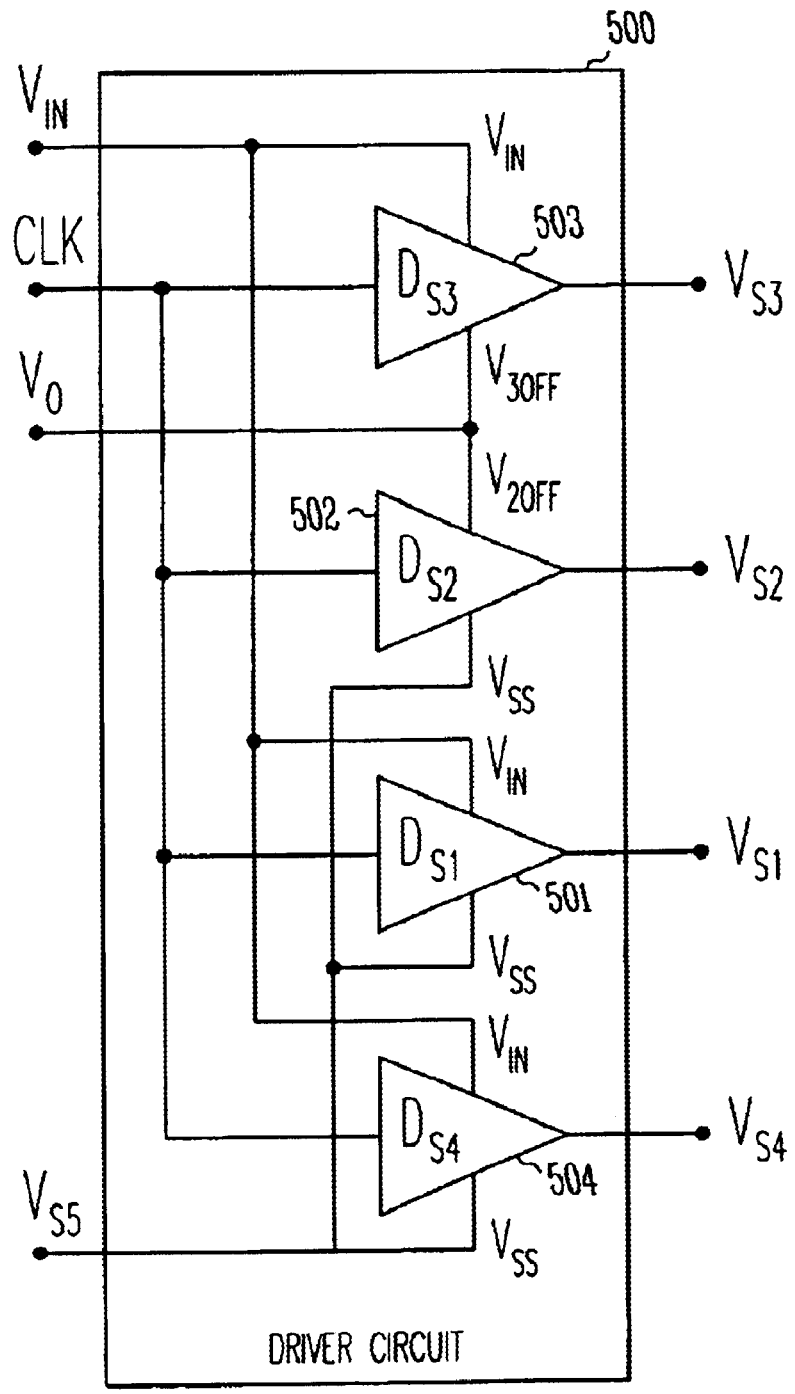
FIG. 5 is a functional block diagram of a driver circuit suitable for generating the switching signals illustrated in FIG. 4 in accordance with an embodiment of the present invention.

FIG. 5 is a functional block diagram of a driver circuit 500 suitable for generating the switching signals illustrated in FIG. 4. Driver circuit 500 may be suitable for use as driver circuit 104 (FIG. 1). Driver circuit 500 includes driver elements 501, 502, 503 and 504 which generate switching signals 411, 412, 413 and 414 respectively in response to an input clock signal. Driver elements 501, 502, 503 and 504 may, for example, be cascaded CMOS inverters suitable for on-die fabrication along with switching circuit 102 (FIG. 1), or may be other devices suitable for generating the switching signals. The switching signal output of each of driver elements 501, 502, 503 and 504 is determined by the supply voltages for each driver element. As illustrated, driver element 503 receives Vin and V3off as supply voltages to generate third switching signal 413 (FIG. 4) at substantially Vin and V3off. Driver element 502 receives V2off and Vss as supply voltages to generate second switching signal 412 (FIG. 4) at substantially V2off and Vss. In this embodiment, V2off and V3off may be substantially the same and may be substantially at the output voltage Vo. Driver elements 501 and 504 both receive Vin and Vss as supply voltages to generate respectively first and fourth switching signals 411 and 414, both at substantially Vin and Vss. A two-phase non-overlapping clock generating circuit preceding driver elements 501–504 may be employed to help guarantee that the switching elements conduct in either the first or second phase of the clock cycle.

Figure 6:
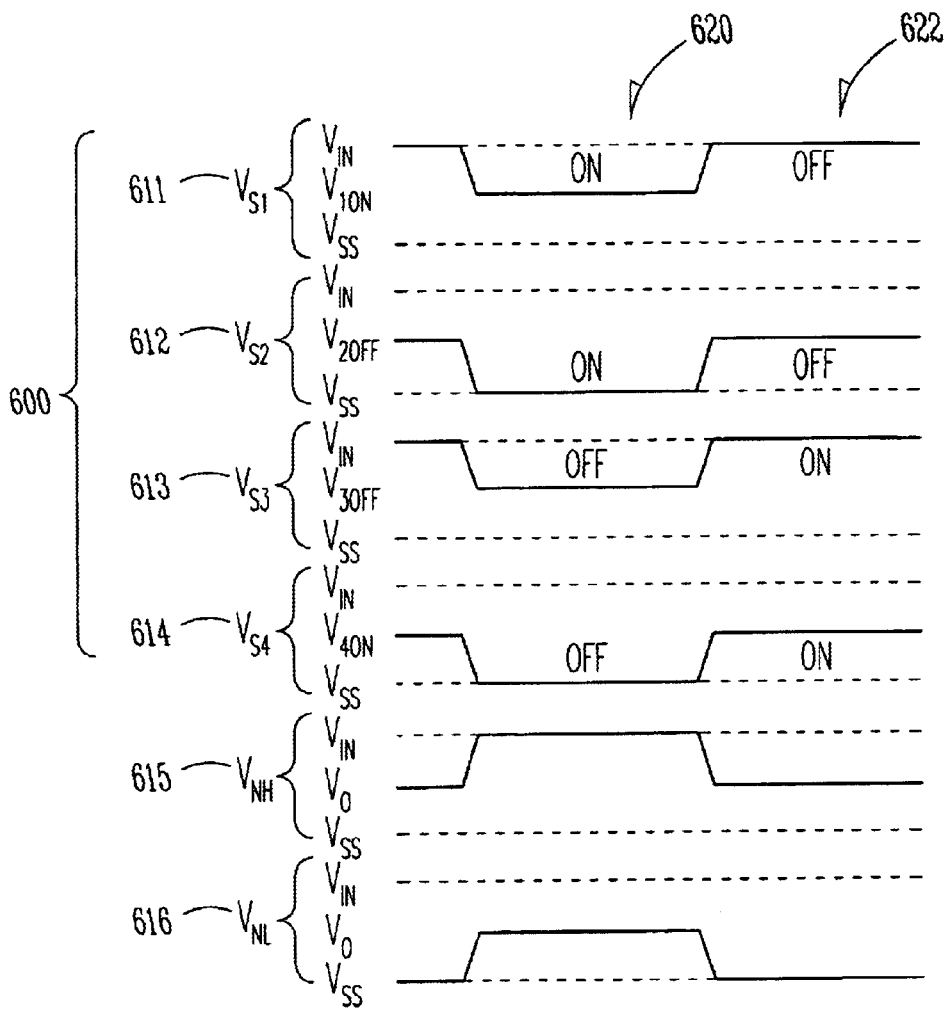
FIG. 6 illustrates voltage levels for a second embodiment of the switching power converter illustrated in FIG. 1.

FIG. 6 illustrates voltage levels for a second embodiment of the switching power converter illustrated in FIG. 1. Switching signals 600 are examples of the switching signals that driver circuit 104 may generate for switching circuit 102. In this embodiment, each of the switching elements may receive partial-swing switching signals.

First switching signal (Vs1) 611 turns on first switching element 111 (FIG. 1) during first portion 620 of a clock cycle and turns off first switching element 111 during second portion 622 of the clock cycle. In this embodiment, a partial-swing voltage (e.g., Vin to V1on) turns on first switching element 111. Second switching signal (Vs2) 612 turns on second switching element 112 (FIG. 1) during first portion 620 of the clock cycle and turns off second switching element 112 during second portion 622 of the clock cycle. In this embodiment, second switching element 112 may be a P-channel MOSFET device and a partial-swing voltage (e.g., Vss to V2off) turns off second switching element 112. Third switching signal (Vs3) 613 turns off third switching element 113 (FIG. 1) during first portion 620 of the clock cycle and turns on third switching element 113 during second portion 622 of the clock cycle. In this embodiment, a partial-swing voltage (e.g., Vin to V3off) turns off third switching element 113. Fourth switching signal (Vs4) 614 turns off fourth switching element 114 (FIG. 1) during first portion 620 of the clock cycle and turns on fourth switching element 114 during second portion 622 of the clock cycle. In this embodiment, a partial-swing voltage (e.g., V4on to Vss) turns off fourth switching element 114. Voltages 615 (VNH) and 616 (VNL) illustrate the voltages respectively at nodes VNH and VNL of power converter 100 (FIG. 1) in response to switching signals 611 through 614.

In accordance with the embodiments of the present invention described herein, an auxiliary power supply may be used to generate V1on, V2off, V3off and/or V4on. The auxiliary power supply may be part of driver circuit 104 (FIG. 1) and may be, for example, a linear series voltage regulator or a switching power converter.

Figure 7:
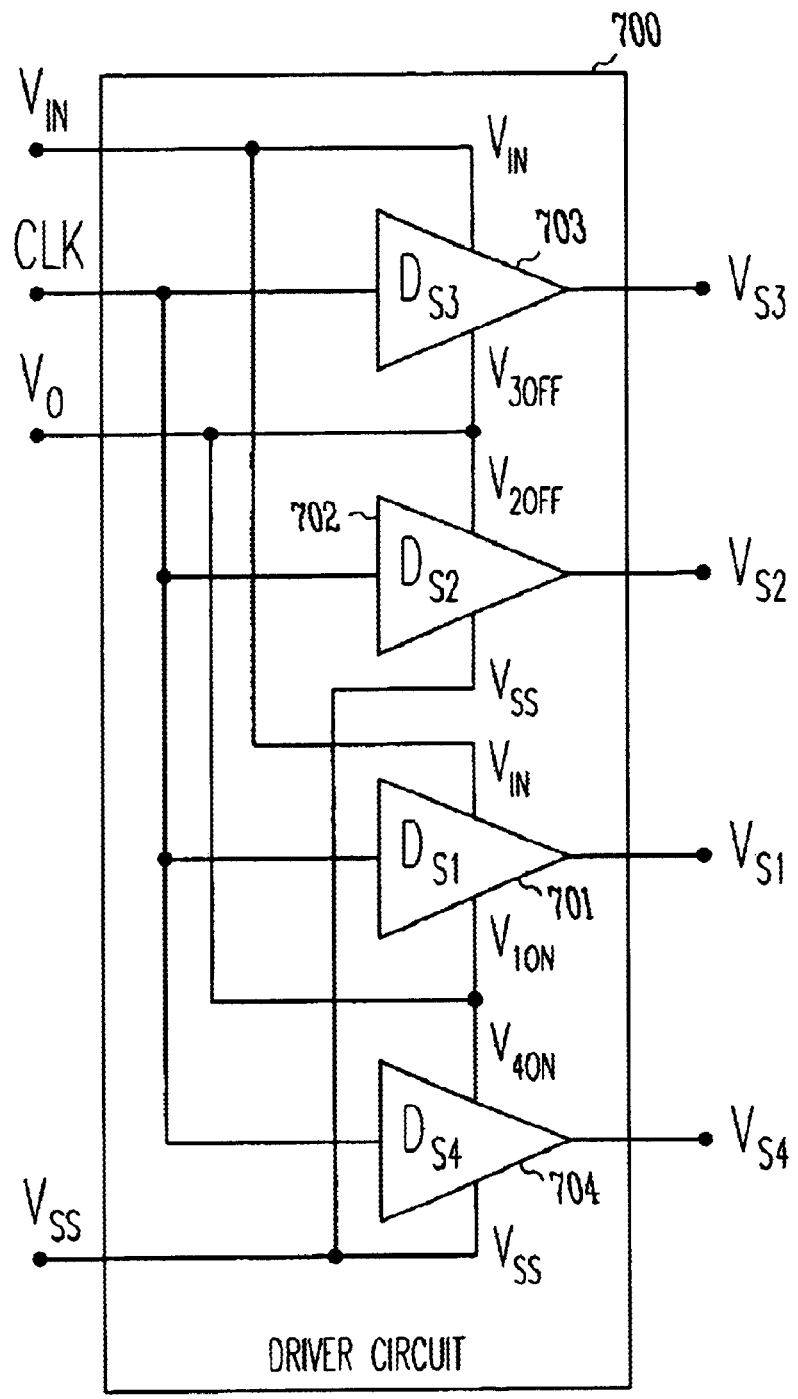
FIG. 7 is a functional block diagram of a driver circuit suitable for generating the switching signals illustrated in FIG. 6 in accordance with an embodiment of the present invention.

FIG. 7 is a functional block diagram of a driver circuit suitable for generating the switching signals illustrated in FIG. 6. Driver circuit 700 may be suitable for use as driver circuit 104 (FIG. 1). Driver circuit 700 includes driver elements 701, 702, 703 and 704 which generate switching signals 611, 612, 613 and 614 respectively in response to an input clock signal. Driver elements 701, 702, 703 and 704 may, for example, be CMOS inverters suitable for on-die fabrication along with switching circuit 102 (FIG. 1), or may be other devices suitable for generating the switching signals. The switching signal output of each of driver elements 701, 702, 703 and 704 is determined by the supply voltages for each driver element. As illustrated, driver element 703 receives Vin and V3off as supply voltages to generate third switching signal 613 (FIG. 6) at substantially Vin and V3off. Driver element 702 receives V2off and Vss as supply voltages to generate second switching signal 612 (FIG. 6) at substantially V2off and Vss. In this embodiment, V2off and V3off may be substantially the same and may be substantially at output voltage Vo. Driver element 701 receives Vin and V1on as supply voltages to generate first switching signal 611 at substantially Vin and V1on. Driver element 704 receives V4on and Vss as supply voltages to generate fourth switching signal 614 at substantially V4on and Vss. In this embodiment, V3off and V4on may be substantially the same and may be substantially at the output voltage Vo. A two-phase non-overlapping clock generating circuit preceding the driver elements may be employed to help guarantee that the switching elements conduct in either the first or second phase of the clock cycle.

Figure 8:
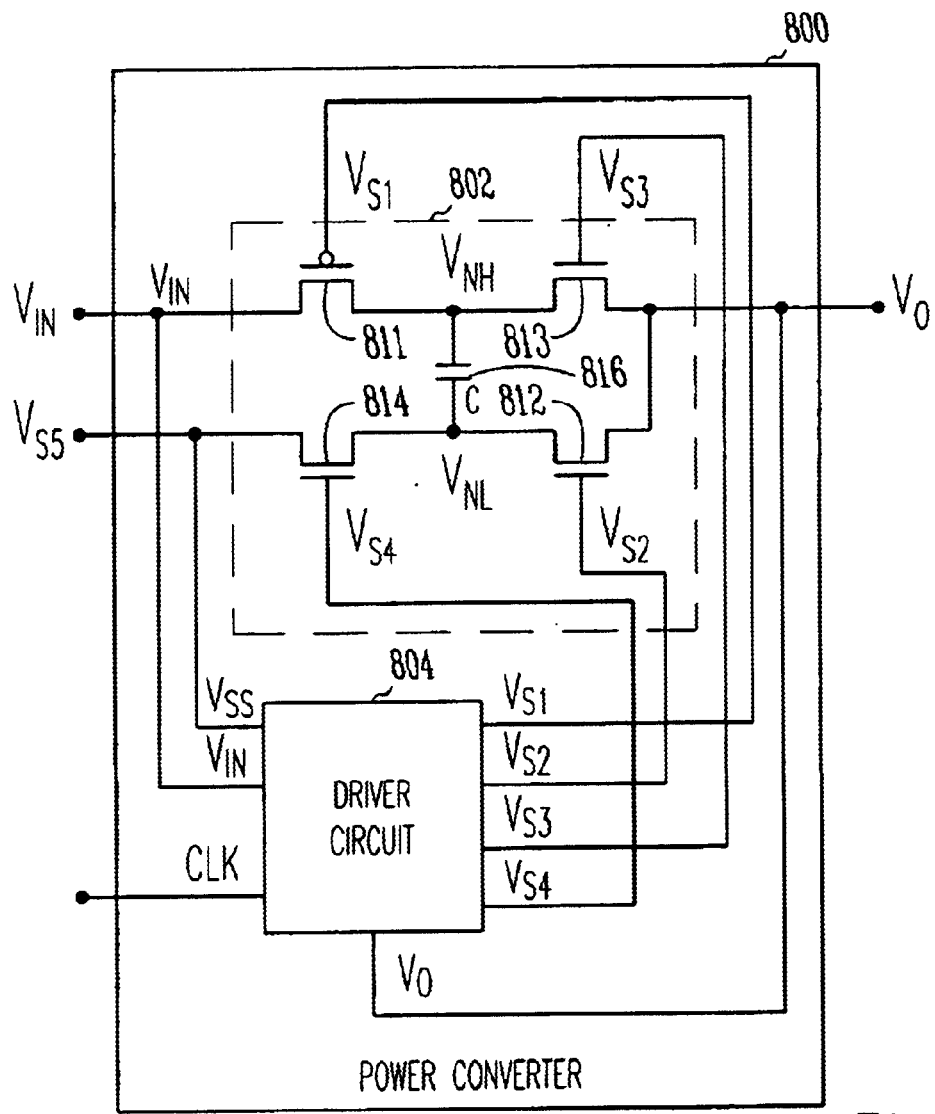
FIG. 8 is a functional block diagram of a switching power converter in accordance with another embodiment of the present invention.

FIG. 8 is a functional block diagram of a single phase switching power converter in accordance with another embodiment of the present invention. Power converter 800 is similar to power converter 100 (FIG. 1) except that switching element 812 of switching circuit 802 may be an N-channel device rather than a P-channel device. In this embodiment, a full-swing switching signal is applied to switching element 812 by driver circuit 804, while full-swing or partial-swing switching signals may be applied to switching elements 811, 813 and 814.

Figure 9:
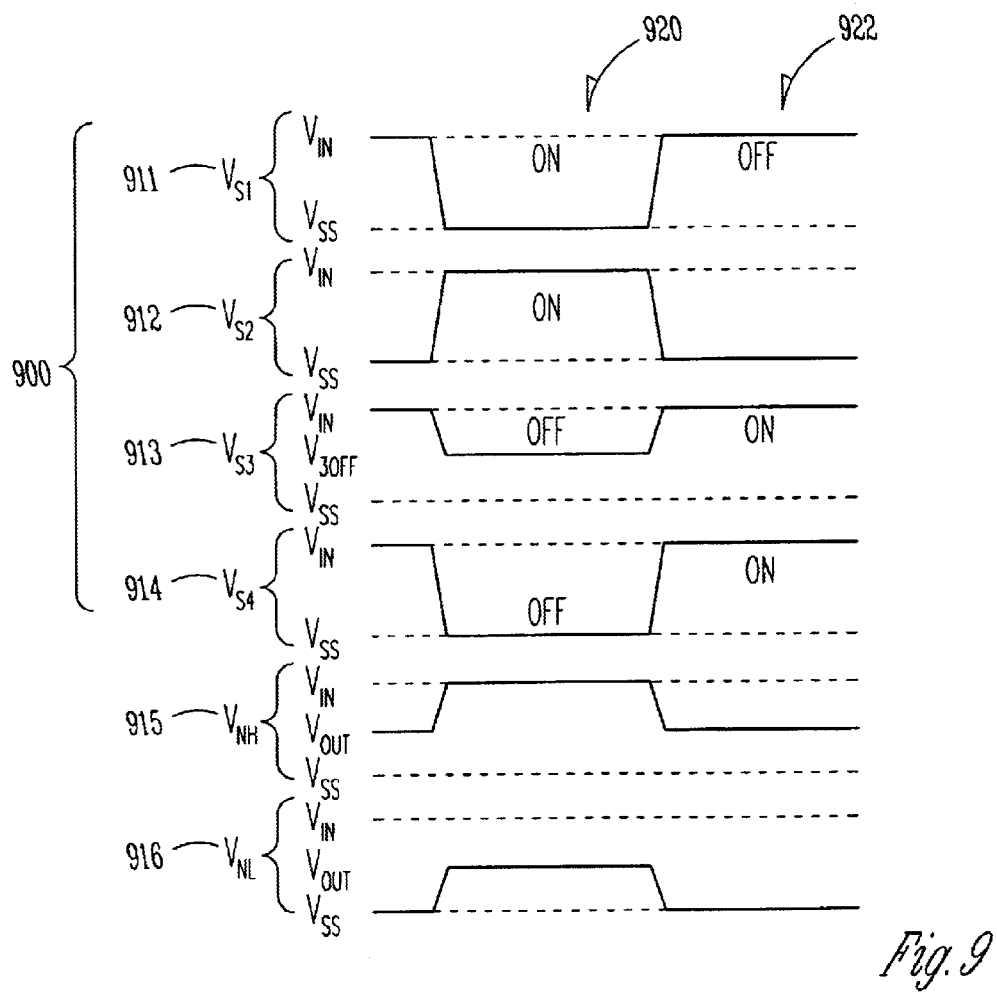
FIG. 9 illustrates voltage levels for a first embodiment of the switching power converter illustrated in FIG. 8.

FIG. 9 illustrates voltage levels for a first embodiment of the switching power converter illustrated in FIG. 8. Switching signals 900 are examples of the switching signals that driver circuit 804 generates for switching circuit 802. In this embodiment, switching element 813 may receive a partial-swing switching signal, while switching elements 811, 812 and 814 receive full-swing switching signals.

First switching signal (Vs1) 911 turns on first switching element 811 (FIG. 8) during first portion 920 of a clock cycle and turns off first switching element 811 during second portion 922 of the clock cycle. In this embodiment, a full swing voltage (e.g., Vin to Vss) turns on first switching element 811. Second switching signal (Vs2) 912 turns on second switching element 812 (FIG. 8) during first portion 920 of the clock cycle and turns off second switching element 812 during second portion 922 of the clock cycle. In this embodiment, second switching element 812 may be an N-channel MOSFET device and a full-swing voltage (e.g., Vin to Vss) turns off second switching element 812. Third switching signal (Vs3) 913 turns off third switching element 813 (FIG. 8) during first portion 920 of the clock cycle and turns on third switching element 813 during second portion 922 of the clock cycle. In this embodiment, a partial-swing voltage (e.g., Vin to V3off) turns off third switching element 813. Fourth switching signal (Vs4) 914 turns off fourth switching element 814 (FIG. 8) during first portion 920 of the clock cycle and turns on fourth switching element 814 during second portion 922 of the clock cycle. In this embodiment, a full-swing voltage (e.g., Vin to Vss) turns off fourth switching element 814. Voltages 915 (VNH) and 916 (VNL) illustrate the voltages respectively at nodes VNH and VNL of power converter 800 (FIG. 8) in response to switching signals 911 through 914.

Figure 10:
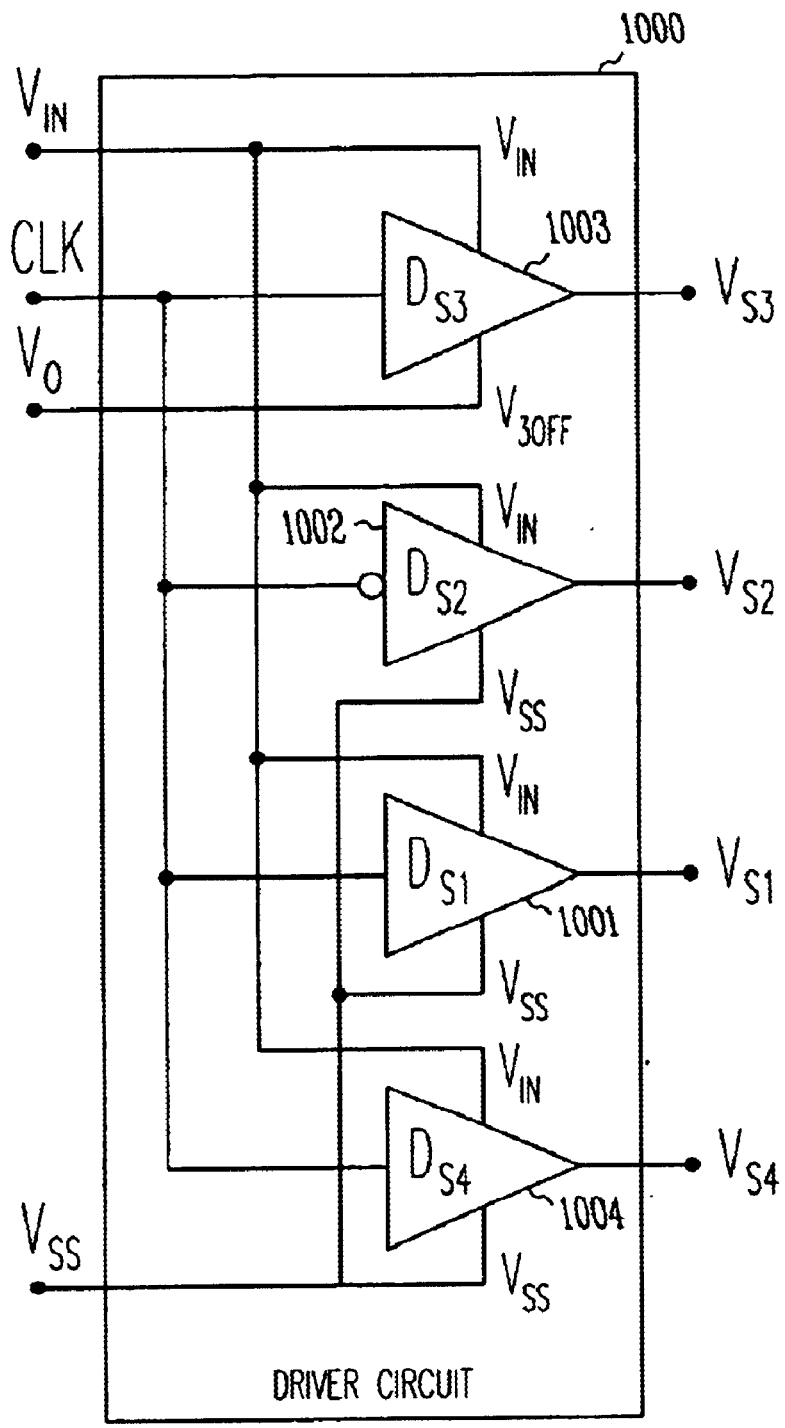
FIG. 10 is a functional block diagram of a driver circuit suitable for generating the switching signals illustrated in FIG. 9 in accordance with an embodiment of the present invention.

FIG. 10 is a functional block diagram of a driver circuit suitable for generating the switching signals illustrated in FIG. 9. Driver circuit 1000 may be suitable for use as driver circuit 804 (FIG. 8). Driver circuit 1000 includes driver elements 1001, 1002, 1003 and 1004 which generate switching signals 911, 912, 913 and 914 respectively in response to an input clock signal. Driver elements 1001, 1002, 1003 and 1004 may, for example, be cascaded CMOS inverters suitable for on-die fabrication with switching circuit 802 (FIG. 8) or other devices suitable for generating the switching signals. The switching signal output of each of driver elements 1001, 1002, 1003 and 1004 is determined by the supply voltages for each driver element. As illustrated, driver element 1003 receives Vin and V3off as supply voltages to generate third switching signal 913 (FIG. 9) at substantially Vin and V3off. In this embodiment, V3off may be substantially at output voltage Vo. Driver element 1002 receives Vin and Vss as supply voltages to generate second switching signal 912 (FIG. 9) at substantially Vin and Vss. Driver element 1002 may have an inverted input (as illustrated) to invert the input clock signal. Driver element 1001 receives Vin and Vss as supply voltages to generate first switching signal 911 at substantially Vin and Vss. Driver element 1004 receives Vin and Vss as supply voltages to generate fourth switching signal 914 at substantially Vin and Vss. A two-phase non-overlapping clock generating circuit may proceed the driver elements to help guarantee that the switching elements conduct in either the first or second phase of the clock cycle.

Figure 11:
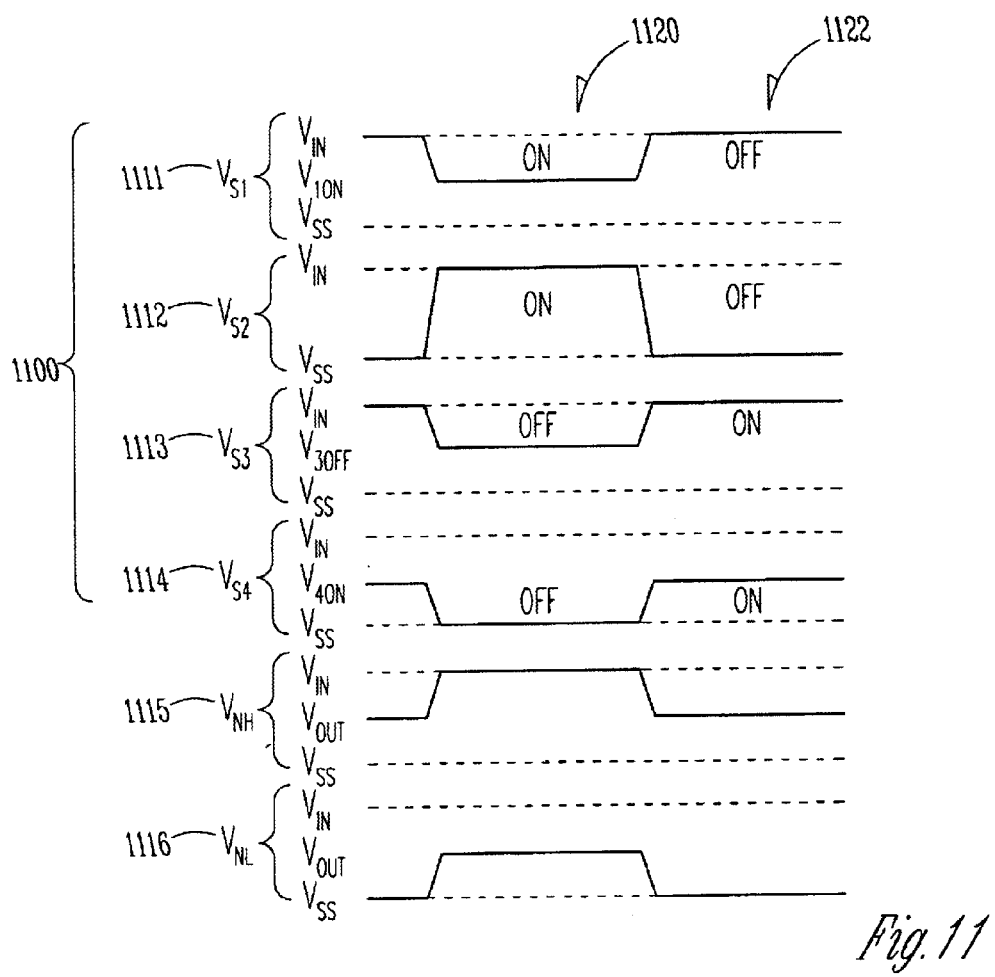
FIG. 11 illustrates voltage levels for a second embodiment of the switching power converter illustrated in FIG. 8.

FIG. 11 illustrates voltage levels for a second embodiment of the switching power converter illustrated in FIG. 8. Switching signals 1100 are examples of the switching signals that driver circuit 804 may generate for switching circuit 802. In this embodiment, switching elements 811, 813 and 814 may receive partial-swing switching signals and switching element 812 receives a full-swing switching signal.

First switching signal (Vs1) 1111 turns on first switching element 811 (FIG. 8) during first portion 1120 of a clock cycle and turns off first switching element 811 during second portion 1122 of the clock cycle. In this embodiment, a partial-swing voltage (e.g., Vin to V1on) turns on first switching element 811. Second switching signal (Vs2) 1112 turns on second switching element 812 (FIG. 8) during first portion 1120 of the clock cycle and turns off second switching element 812 during second portion 1122 of the clock cycle. In this embodiment, second switching element 812 may be an N-channel MOSFET device and a full-swing voltage (e.g., Vin to Vss) turns off second switching element 812. Third switching signal (Vs3) 1113 turns off third switching element 813 (FIG. 8) during first portion 1120 of the clock cycle and turns on third switching element 813 during second portion 1122 of the clock cycle. In this embodiment, a partial-swing voltage (e.g., Vin to V3off) turns off third switching element 813. Fourth switching signal (Vs4) 1114 turns off fourth switching element 814 (FIG. 8) during first portion 1120 of the clock cycle and turns on fourth switching element 814 during second portion 1122 of the clock cycle. In this embodiment, a partial-swing voltage (e.g., V4on to Vss) turns on fourth switching element 814. Voltages 1115 (VNH) and 1116 (VNL) illustrate the voltages respectively at nodes VNH and VNL of power converter 800 (FIG. 8) in response to switching signals 1111 through 1114.

Figure 12:
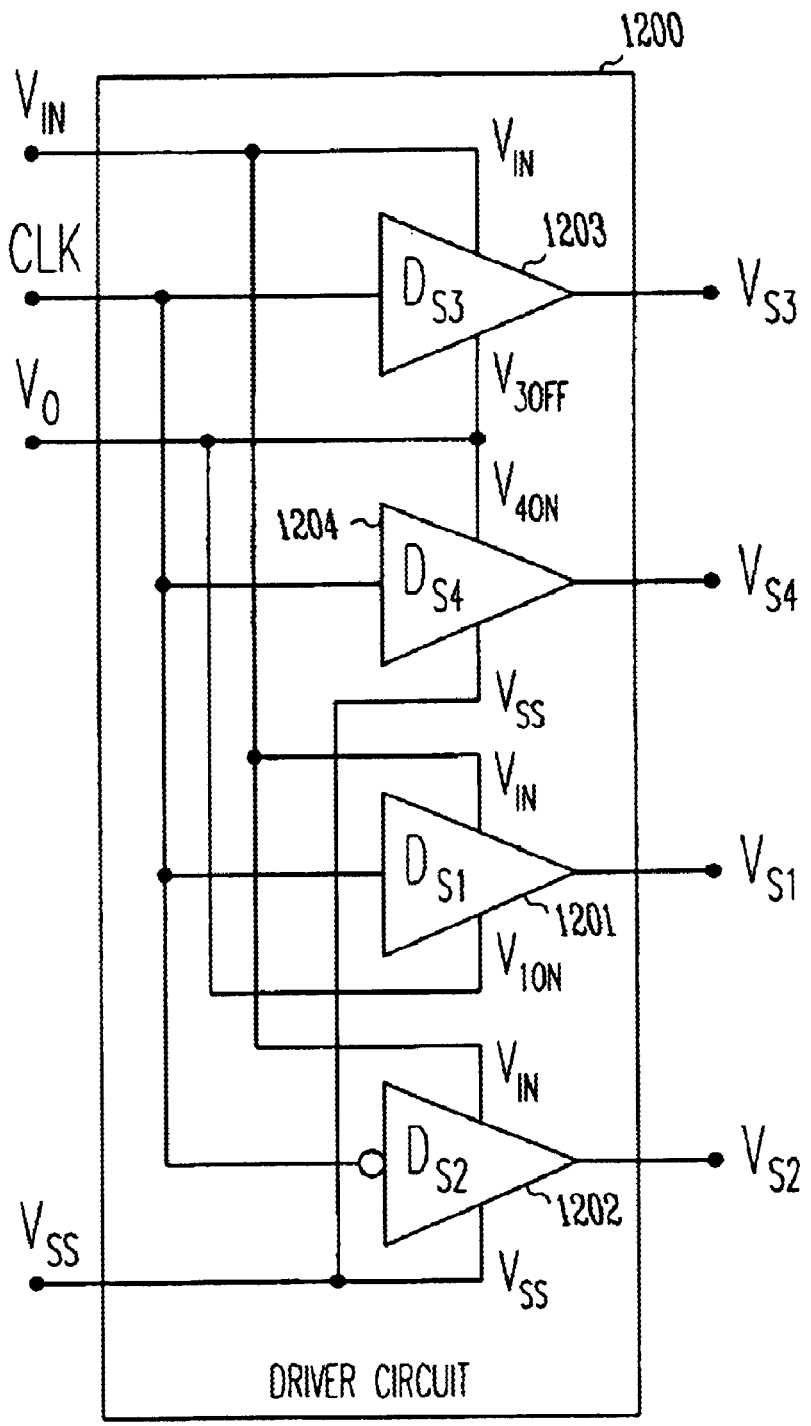
FIG. 12 is a functional block diagram of a driver circuit suitable for generating the switching signals illustrated in FIG. 11 in accordance with an embodiment of the present invention.

FIG. 12 is a functional block diagram of a driver circuit suitable for generating the switching signals illustrated in FIG. 11. Driver circuit 1200 may be suitable for use as driver circuit 804 (FIG. 8). Driver circuit 1200 includes driver elements 1201, 1202, 1203 and 1204 which generates switching signals 1111, 1112, 1113 and 1114 (FIG. 11) respectively in response to an input clock signal. Driver elements 1201, 1202, 1203 and 1204 may, for example, be CMOS inverters suitable for on-die fabrication along with switching circuit 802 (FIG. 8), or may be other devices suitable for generating the switching signals. The switching signal output of each of driver elements 1201, 1202, 1203 and 1204 is substantially determined by the supply voltages for each driver element. As illustrated, driver element 1203 receives Vin and V3off as supply voltages to generate third switching signal 1113 (FIG. 11) at substantially Vin and V3off.

Driver element 1204 receives V4on and Vss as supply voltages to generate fourth switching signal 1114 (FIG. 11) at substantially V4on and Vss. In this embodiment, V4on and V3off may be substantially the same and may be substantially at output voltage Vo. Driver element 1201 receives Vin and V1on as supply voltages to generate first switching signal 1111 at substantially Vin and V1on.

Driver element 1202 receives Vin and Vss as supply voltages to generate second switching signal 1112 at substantially Vin and Vss. In this embodiment, because switching element 812 is an N-channel MOSFET device, driver element 1202 may have an inverted input as illustrated. A two-phase non-overlapping clock generating circuit preceding driver elements may be employed to help guarantee that the switching elements conduct in either the first or second phase of the clock cycle.

Figure 13:
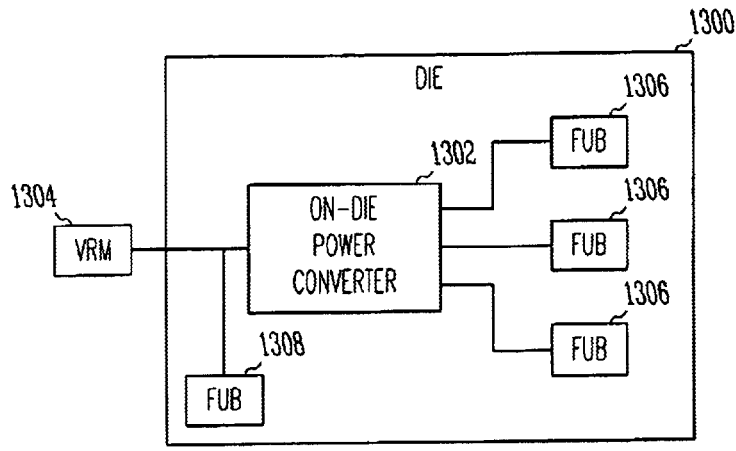
FIG. 13 is a functional block diagram of a semiconductor die in accordance with an embodiment of the present invention.

FIG. 13 is a functional block diagram of a semiconductor die in accordance with an embodiment of the present invention. Semiconductor die 1300 includes on-die power converter 1302 which receives an input voltage, for example, from off die voltage regulation module (VRM) 1304 to generate an output voltage to one or more functional unit blocks (FUBs) 1306. An FUB may be an element fabricated on semiconductor die 600 that may require an input voltage and may include, for example, a memory, a cache, a register file, a scheduler, a multiplier, an adder, a shifter, an ALU, I/O, a microprocessor, etc. Power converter 1302 may be similar to power converter 100 (FIG. 1), power converter 200 (FIG. 2) or power converter 800 (FIG. 8) and may be fabricated on die 1300 using, for example, a CMOS process. In this embodiment, VRM 1304 can generate a higher voltage to the die reducing the current flowing to the die.

This, for example, improves interconnect reliability and reduces the parasitic effects of the current path to the die. Power converter 1302 may receive input voltage from an on-die source rather than directly from VRM 1304.

In one embodiment of the present invention, semiconductor die 1300 may also include critical path FUBs 1308 which receive input power directly from VRM 1304 or other sources. The present invention allows power converter 1302 to generate a lower output voltage for non-critical FUBs to conserver power. In this embodiment, FUBs 1306 may be non-critical path FUBs.

Figure 14:
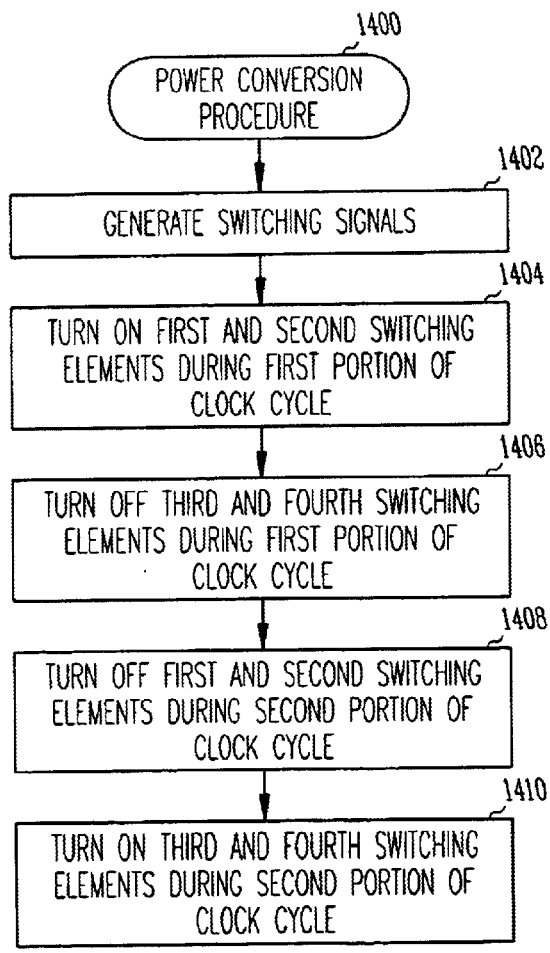
FIG. 14 is a power conversion procedure in accordance with an embodiment of the present invention.

FIG. 14 is a power conversion procedure in accordance with an embodiment of the present invention. Power conversion procedure 1400 may be performed by power converter 100 (FIG. 1), power converter 200 (FIG. 2) or power converter 800 (FIG. 8). Operation 1402 generates switching signals for the switching elements of the power converter. At least one of the switching signals is a partial-swing switching signal. Suitable switching signals for power converter 100 (FIG. 1) are illustrated in FIGS. 4 and 6, and suitable switching signals for power converter 800 (FIG. 8) are illustrated in FIGS. 9 and 11. Operation 1404 turns on the first and second switching elements during a first portion of the clock cycle and operation 1406 turns off the third and fourth switching elements during the first portion of the clock cycle. Operation 1408 turns off the first and second switching elements during a second portion of the clock cycle and operation 1410 turns on the third and fourth switching elements during the second portion of the clock cycle. The clock cycle may have a duty-cycle of around 50%, although the present invention is also suitable for use with other duty-cycles. Although the individual operations of procedure 1400 are illustrated and described as separate operations, it should be noted that one or more of the individual operations may be performed concurrently. Further, nothing necessarily requires that the operations be performed in the order illustrated.

Figure 15:
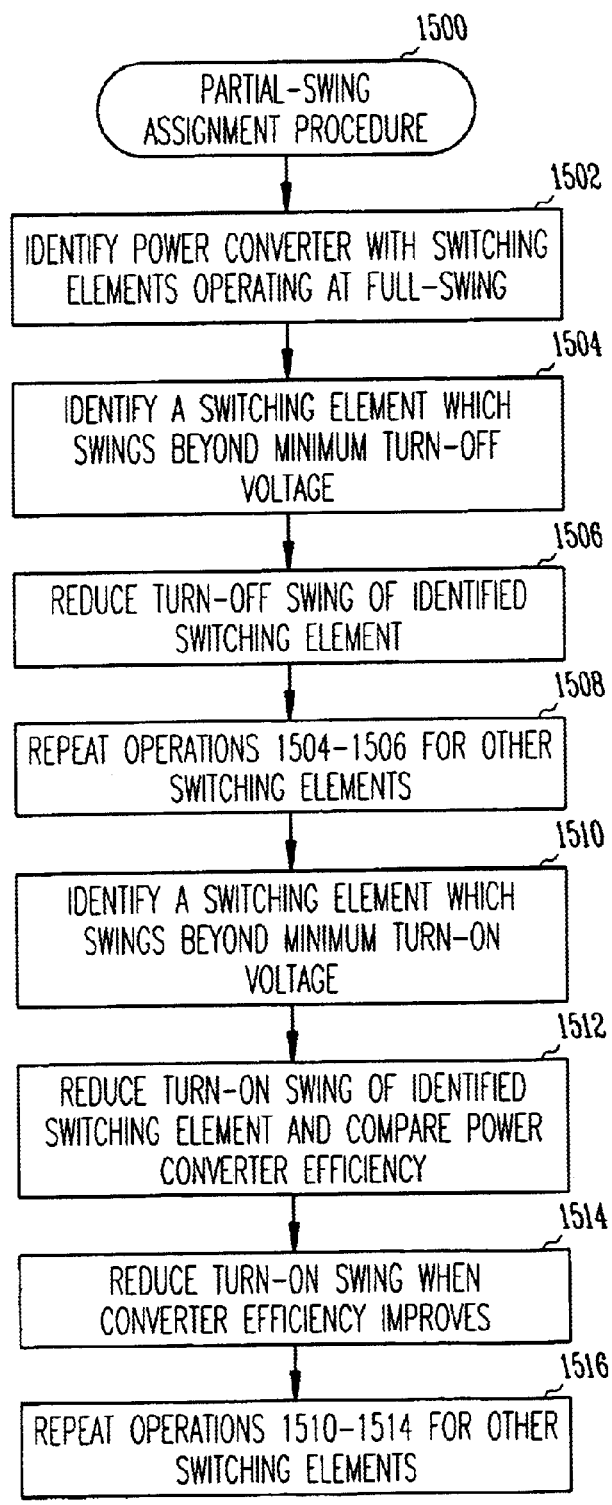
FIG. 15 is a block diagram of a partial swing assignment procedure in accordance with an embodiment of the present invention.

FIG. 15 is a block diagram of a partial swing assignment procedure in accordance with an embodiment of the present invention. Procedure 1500 identifies switching elements of a power converter which may have their swing voltages reduced to improve efficiency. Operation 1502 identifies a power converter with switching elements operating at full-swing. The identified power converter may include three-terminal switching elements where at least one of the switching elements has a control terminal operated at full swing. Operation 1504 identifies a switching element of the power converter which swings beyond the minimum turn-off voltage. Operation 1506 reduces the turn-off swing voltage of the identified switching element. The turn-off swing voltage may be reduced to a minimum turn-off voltage. Although reducing the turn-off swing voltage may decrease the series resistance in some switching elements, such as MOSFETs, the efficiency of the power converter is improved since the switching elements do not conduct when turned off. Therefore it is not necessary to consider whether decreasing the turn-off swing voltage for a switching element improves the efficiency of the power converter. Operation 1508 repeats operations 1504–1506 to identify other switching elements with a turn-off swing voltage greater than necessary.

Operation 1510 identifies a switching element which may receive a full-swing turn-on voltage. Operation 1512 temporarily reduces the turn-on swing voltage of the identified switching element and determines if the efficiency is improved. Operation 1512, for example, may be performed by analysis, computer simulation or actual measurements. Operation 1514 reduces the turn-on swing voltage when efficiency is improved. The turn-on swing voltage may be reduced to a minimum turn-on voltage. Because reducing the turn-on swing voltage may increase the series resistance in some switching elements, such as MOSFETs, the efficiency of the power converter may not always be improved since the switching elements conduct when turned on. Therefore it is desirable to consider whether decreasing the turn-on swing voltage for a particular switching element improves the efficiency of the power converter. Operation 1516 repeats operations 1510–1514 for other switching elements.

Thus, an improved power converter and power conversion method have been described. More efficient power conversion is achieved by reducing the amount of energy to charge and discharge gate capacitance of switching elements that have capacitive gate control inputs. In alternate embodiments, semiconductor die efficiency may also be improved by allowing non-critical path FUBs on the die to receive a lower voltage from the power converter during a power conservation mode.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments. It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. An on-die DC to DC switching power converter comprising:
   a plurality of switching elements having capacitive gate control inputs;
   an energy storage element coupled to the switching elements; and
   a driver circuit to generate switching signals to the gate control inputs, at least one of the switching signals being a partial-swing switching signal, the driver circuit applying the partial-swing switching signal for a duty-cycle of approximately fifty percent.

2. An on-die DC to DC switching power converter comprising:
   a plurality of switching elements having capacitive gate control inputs;
   an energy storage element coupled to the switching elements; and
   a driver circuit to generate switching signals to the gate control inputs, at least one of the switching signals being a partial-swing switching signal, wherein a first of the switching elements couples an input voltage (Vin) to a first terminal of the energy storage element, a second of the switching elements couples a second terminal of the energy storage element to an output of the power converter, a third of the switching elements couples the first terminal of the energy storage element to the output of the power converter, and a fourth of the switching elements couples the second terminal of the energy storage element with a reference voltage (Vss), wherein the driver circuit generates the at least one partial-swing switching signal to turn off the third switching element when the at least one partial-swing switching signal transitions from Vin to a turn-off voltage (V3off), V3off being substantially an output voltage (Vo) of the power converter.

3. The power converter as claimed in claim 2 wherein the first switching element is a P-channel MOSFET, the second switching element is a P-channel MOSFET or an N-channel MOSFET, and the third and fourth switching elements are N-channel MOSFETs, and when the second switching element is the P-channel MOSFET, the driver circuit generates a partial-swing switching signal to turn off the second switching element when the partial-swing switching signal transitions from Vss to a turn-off voltage (V2off), V2off being substantially Vo, and when the second switching element is the N-channel MOSFET, the driver circuit generates a full-swing switching signal to turn off the second switching element when the full-swing switching signal transitions from substantially Vin to substantially Vss.

4. The power converter as claimed in claim 3 wherein the driver circuit generates a partial-swing switching signal to turn off the first switching element when the partial-swing switching signal transitions from substantially Vin to a turn-on voltage (V1on), V1on being substantially Vo, and wherein the driver circuit generates a partial-swing switching signal to turn on the fourth switching element when the partial-swing switching signal transitions from substantially Vss to a turn-on voltage (V4on), V4on being substantially Vo.

5. The power converter as claimed in claim 3 wherein the driver circuit generates a full-swing switching signal to turn on the first switching element when the full-swing switching signal transitions from substantially Vin to substantially Vss, and wherein the driver circuit generates a full-swing switching signal to turn on the fourth switching element when the full-swing switching signal transitions from substantially Vss to substantially Vin.

6. The power converter as claimed in claim 4 wherein driver circuit generates the switching signals from a clock signal, the driver circuit being comprised of a plurality of CMOS inverters, and wherein the first and second switching elements are turned on by the switching signals during a first portion of the clock cycle, the third and fourth switching elements are turned off by the switching signals during the first portion of the clock cycle, the first and second switching elements are turned off by the switching signals during a second portion of the clock cycle, and the third and fourth switching elements are turned on by the switching signals during the second portion of the clock cycle.

7. An on-die DC to DC switching power converter comprising:

a plurality of switching elements having capacitive gate control inputs;

an energy storage element coupled to the switching elements; and a driver circuit to generate switching signals to the gate control inputs, at least one of the switching signals being a partial-swing switching signal, wherein the energy storage element is comprised of gate capacitances of MOSFETs.

8. The power converter as claimed in claim 4 wherein the driver circuit comprises:

a first CMOS inverter to generate the partial-swing switching signal for the first switching element, the first inverter receiving Vin and V1on as supply voltages; and a second CMOS inverter to generate the switching signal for the second switching element, the second inverter receiving V2off and Vss as supply voltages when the second switching element is the P-channel MOSFET, and receiving Vin and Vss as supply voltages when the second switching element is the N-channel MOSFET.

9. The power converter as claimed in claim 8 wherein the driver circuit further comprises a third CMOS inverter to generate the partial-swing switching signal to the third switching element, the third inverter receiving Vin and V3off as supply voltages.

10. The power converter as claimed in claim 9 wherein the driver circuit further comprises a fourth CMOS inverter to generate the partial-swing switching signal to the fourth switching element, the fourth inverter receiving V4on and Vss as supply voltages.

11. An on-die DC to DC switching power converter comprising:

a plurality of switching elements having capacitive gate control inputs;

an energy storage element coupled to the switching elements; and a driver circuit to generate switching signals to the gate control inputs, at least one of the switching signals being a partial-swing switching signal, wherein the switching elements, the energy storage element and the driver circuit are fabricated on a single semiconductor die to generate an output voltage (Vo) for at least one of a plurality of functional unit blocks on the semiconductor die.

12. The power converter as claimed in claim 11 wherein during a power conservation mode, the power converter generates a lower output voltage for the at least one of the functional unit blocks, wherein other functional unit blocks receive power from other power sources on the die.

13. An on-die DC to DC switching power converter comprising:

a plurality of switching elements having capacitive gate control inputs;

an energy storage element coupled to the switching elements; and a driver circuit to generate switching signals to the gate control inputs, at least one of the switching signals being a partial-swing switching signal, wherein the power converter is one of a plurality of substantially similar single phase power converters that comprise a multiphase power converter, wherein the driver circuit of each single phase power converter of the multiphase power converter receives a phase-shifted clock signal to generate the switching signals.

14. The power converter as claimed in claim 13 further wherein the switching elements, the energy storage element and the driver circuit of each single phase power converter are fabricated on a single semiconductor die, and the multiphase power converter further comprises a clock signal phase generator to generate one of the phase-shifted clock signals to each of the single phase power converters, wherein one or more functional unit blocks on the die receive an output voltage from the multiphase power converter, and wherein each phase-shifted clock signal is shifted in phase from the other phase-shifted clock signals.

15. A semiconductor die comprising:

a functional unit block; and an on-die power converter to generate an output voltage (Vo) to the functional unit block, wherein the on die power converter comprises:
  a energy storage element;
  a plurality of switching elements; and
  a driver circuit to generate switching signals for the switching elements, at least one of the switching signals being a partial-swing switching signal, the driver circuit applying the partial-swing switching signal for a duty-cycle of approximately fifty percent.

16. A semiconductor die comprising:
  a functional unit block; and
  an on-die power converter to generate an output voltage (Vo) to the functional unit block,
  wherein the on die power converter comprises:
    a energy storage element;
    a plurality of switching elements; and
    a driver circuit to generate switching signals for the switching elements, at least one of the switching signals being a partial-swing switching signal,
    wherein a first of the switching elements couples an input voltage (Vin) to a first terminal of the energy storage element, a second of the switching elements couples a second terminal of the energy storage element to an output of the power converter, a third of the switching elements couples the first terminal of the energy storage element to the output of the power converter, and
    a fourth of the switching elements couples the second terminal of the energy storage element with a reference voltage (Vss), and
    wherein the driver circuit generates the at least one partial-swing switching signal to turn off the third switching element when the at least one partial-swing switching signal transitions from Vin to a turn-off voltage (V3off), V3off being substantially Vo.

17. The semiconductor die as claimed in claim 16 wherein the first switching element is a P-channel MOSFET, the second switching element is either a P-channel MOSFET or an N-channel MOSFET, and the third and fourth switching elements are N-channel MOSFETs, and wherein the energy storage element is comprised of gate capacitances of MOSFETs fabricated on the semiconductor die.

18. The semiconductor die as claimed in claim 17 wherein when the second switching element is the P-channel MOSFET, the driver circuit generates a partial-swing switching signal to turn off the second switching element when the partial-swing switching signal transitions from Vss to a turn-off voltage (V2off), V2off being substantially Vo, and
  wherein when the second switching element is the N-channel MOSFET, the driver circuit generates a full-swing switching signal to turn off the second switching element when the full-swing switching signal transitions from substantially Vin to substantially Vss.

19. A semiconductor die comprising:
  a functional unit block; and
  an on-die power converter to generate an output voltage (Vo) to the functional unit block,
  wherein the on die power converter comprises:
    a energy storage element;
    a plurality of switching elements; and
    a driver circuit to generate switching signals for the switching elements, at least one of the switching signals being a partial-swing switching signal,
    wherein the driver circuit generates the switching signals from a clock signal, the driver circuit being comprised of a plurality of CMOS inverters.

20. A semiconductor die comprising:
  a fictional unit block; and
  an on-die power converter to generate an output voltage (Vo) to the functional unit block,
  wherein the on die power converter comprises:
    a energy storage element;
    a plurality of switching elements; and
    a driver circuit to generate switching signals for the switching elements, at least one of the switching signals being a partial-swing switching signal,
    wherein during a power conservation mode, the power converter generates a lower output voltage for the functional unit block, wherein another functional unit block receives power from other power sources on the die.

21. A semiconductor die comprising:
  a functional unit block; and
  an on-die power converter to generate an output voltage (Vo) to the functional unit block,
  wherein the on die power converter comprises:
    a energy storage element;
    a plurality of switching elements; and
    a driver circuit to generate switching signals for the switching elements, at least one of the switching signals being a partial-swing switching signal,
    wherein the power converter is one of a plurality of substantially similar single phase power converters that comprise a multiphase power converter, wherein the driver circuit of each single phase power converter receives a phase-shifted clock signal to generate the switching signals, and wherein the switching elements, the energy storage element and the driver circuit of each single phase power converter of the multiphase power converter are fabricated on the semiconductor die, and the semiconductor die further comprises:
      a clock signal phase generator to generate one of the phase-shifted clock signals for each of the single phase power converters, and
      one or more functional unit blocks on the die to receive an output voltage from the multiphase power converter.

22. The semiconductor die as claimed in claim 21 wherein each phase-shifted clock signal is shifted in phase from the other phase-shifted clock signals.

23. A method of converting an input voltage (Vin) to an output voltage (Vo) on a semiconductor die comprising:
  turning on a first switching element during a first portion of a clock cycle when a first switching signal transitions from Vin to a turn-on voltage (V1on);
  turning on a second switching element during the first portion of the clock cycle when a second switching signal transitions from a turn-off voltage (V2off) to a turn-on voltage (V2on);
  turning off a third switching element during the first portion of the clock cycle when a third switching signal transitions from Vin to a turn-off voltage (V3off); and
  turning off a fourth switching element during the first portion of the clock cycle when a fourth switching signal transitions from a turn-off voltage (V4on) to a reference voltage (Vss), wherein the third switching signal is a partial-swing switching signal and V3off is substantially equal to Vo.

24. The method as claimed in claim 23 wherein the first switching element is a P-channel MOSFET and the third and fourth switching elements are N-channel MOSFETs, and the second switching element is a P-channel MOSFET or an N-channel MOSFET, when the second switching element is the P-channel MOSFET, the method includes turning off the second switching element with a partial-swing switching signal when the partial-swing switching signal transitions from Vss to a turn-off voltage (V2off), V2off being substantially Vo, and when the second switching element is the N-channel MOSFET, the method includes turning off the second switching element with a full-swing switching signal when the full-swing switching signal transitions from substantially Vin to substantially Vss.

25. The method as claimed in claim 24 further comprising turning on the first switching element with a partial-swing switching signal when the partial-swing switching signal transitions from substantially Vin to a turn-on voltage (V1on), V1on being substantially Vo; and turning on the fourth switching element with a partial-swing switching signal when the partial-swing switching signal transitions from substantially Vss to a turn-on voltage (V4on), V4on on being substantially Vo.

26. The method as claimed in claim 23 further comprising generating the switching signals from a clock signal.

27. The method as claimed in claim 23 wherein the first switching element couples an input voltage source to a first terminal of an energy storage element, the second switching element couples a second terminal of the energy storage element to an output of the power converter, the third switching element couples the first terminal of the energy storage element to the output of the power converter, and the fourth switching element couples the second terminal of the energy storage element with a reference supply of the power converter.

28. The method as claimed in claim 23 further comprising:

turning off the first switching element during a second portion of the clock cycle when the first switching signal transitions from V1on to Vin;

turning off the second switching element during the second portion of the clock cycle when the second switching signal transitions from V2on to V2off;

turning on the third switching element during the second portion of the clock cycle when the third switching signal transitions from V3off to Vin; and turning on the fourth switching element during the second portion of the clock cycle when the fourth switching signal transitions from Vss to V4on.

* * * * *